Patented Oct. 22, 1940

2,218,582

UNITED STATES PATENT OFFICE 2,218,582

METHOD FOR TANNING HIDES AND SKINS

Kurt Lindner, Berlin, Germany, assignor to Hall Laboratories, Inc., Pittsburgh, Pa., a corporation of Pennsylvania No Drawing. Application July 18, 1938, Serial No. 219,830. In Germany July 20, 1937

13 Claims. (Cl. 149—5)

It is already known to employ as tanning material polymeric metaphosphoric acids or their salts alone or in combination with other tanning agents.

I have found that the acid, water-soluble organic esters of polymeric metaphosphoric acids produced by the reaction of polymeric metaphosphoric acids or of fusion products containing polymeric metaphosphoric acids, with organic compounds containing hydroxyl groups or olefinic bonds or both, as well as the water-soluble salts of these reaction products, produce excellent tanning effects either alone or in combination with other known tanning agents. Furthermore the complex compounds of these reaction products with di- or polyvalent metals, such as calcium, magnesium, chromium, iron, copper, etc., are employed with advantage in the tanning of hides and skins.

The leathers tanned with these reaction products or their water-soluble salts or their complex compounds were found to be superior in feel and touch to those tanned with polymeric metaphosphoric acids or their water-soluble salts with uni- or polyvalent metals or with ammonia or organic bases.

Especially I have found that such products are suited for tanning which are derived from the reaction of hexametaphosphoric acid or even higher polymeric metaphosphoric acids and organic hydroxy compounds, such as lower or higher alcohols, polyhydric alcohols, phenols, cresols, naphthols, sugars, all kinds of starch (amylum), etc., which form at high temperatures and in the presence of inert liquids.

Tanning with these reaction products or their water-soluble salts is performed in tanning liquors, the pH value of which is generally adjusted to 2.5–4.5 preferably by means of alkalies, ammonia or organic bases.

Not only the reaction products and their monosalts but also their complex compounds with di- or polyvalent metals, such as calcium, magnesium, copper, nickel, manganese, aluminum, iron or chromium, are excellent tanning agents.

The combination tannage is performed in such manner that either the pretannage or the retannage is accomplished with the new tanning material. When the pretanning process with the new products is followed by a vegetable, chromium or iron retannage, leathers of a very good, light colour are obtained.

The new products are also suitable as deliming materials. A further advantage of the new product is the possibility of using them as fat liquoring materials, if their organic group is a high molecular derivative of a fatty acid or alcohol with 12 or more carbon atoms.

*Example 1.*—50 parts of cresol and up to 250 parts of hexametaphosphoric acid are heated to a temperature of 100–110° C. A water-soluble product is obtained. 20–40 lbs. of this product are added to 100 lbs. of a bated stock of calf skin and 100 lbs. of water in a drum. If necessary, an acid is added to bring the pH value of the bath to pH=2.2. The stock runs in this liquor for 24 hours. After a short washing the stock is fatliquored, drained and dried. A white, plain leather is obtained.

*Example 2.*—280 parts of oleic alcohol and 500 parts of hexametaphosphoric acid free from water are brought to reaction. For 100 lbs. bated weight of a sheep skin take 30 lbs. of this product and 100 lbs. of water and let run in a drum for 24 hours at a pH of 4.5. After short washing, draining and drying a good white glove leather results.

*Example 3.*—Sheep pelts are pretanned with 5% of the reaction product obtained from 240 parts of castor-oil and 400 parts of anhydrous hexametaphosphoric acid, the pH value of the solution being adjusted to 4.5. Then follows a retannage with a vegetable or synthetic tanning agent (which may be for example a benzidine derivative). Retannage may be accomplished within a shorter time than usual without risk of a drawn grain.

*Example 4.*—Chrome-tanned cow-hide is fulled for several hours with 7.5% of a reaction product of octometaphosphoric acid and resorcin at a pH of 2–2.5, then neutralised, greased and finished for sporting leather, the colour of which is much lighter than without this retannage.

*Example 5.*—Equal parts of potato starch and a pulverised acid sodium metaphosphate $$(NaPO_3.HPO_3)_6$$

are thoroughly mixed. 100 lbs. of bated goat skin and 15 lbs. of this reaction product and 5 lbs. of water glass solution of 38° Bé. and 100 lbs. of water are put into a drum. Let run for 24 hours at a pH value of 3.5. Then follows a usual chromium tanning. After neutralising and fatliquoring good boot uppers are obtained.

*Example 6.*—To 10 parts of the cresol reaction product of Example 1, 3.1 parts of $FeCl_3.6H_2O$ and 100 parts of water are added and mixed. A complex colourless iron compound results. Put this solution into a drum with 50 lbs. of calf skin and let run for 24 hours. A white leather results. Instead of the sesquichlorid of iron there may also be employed 5.4 parts of K-Al-alum or 5.7 parts of K-Cr-alum. In the reaction product of polymeric metaphosphoric acid the cresol may be substituted by chlorphenol, amidophenol, nitrophenol, phloroglucin or salicyclic acid.

*Example 7.*—Bring the reaction product of dodecametaphosphoric acid and glucose with $K_2CO_3$ to a pH value of 3.5. Mix 8 lbs. of this product with 8 lbs. of egg yolk, 10 lbs. of flour, 3 lbs. of salt and 4 lbs. of water. 100 lbs. of bated kid skins are fulled with this mixture for several hours. After drying, staking and finishing in the usual manner a good kid-glove leather results.

What I claim is:

1. A method of tanning hides and skins which comprises treating the skin with a solution containing as its essential tanning agent a compound which is prepared by reaction of polymeric phosphoric acids with organic compounds containing hydroxyl groups.

2. A method of tanning hides and skins which comprises treating the skin with a solution containing as its essential tanning agent a compound which is prepared by reaction of polymeric phosphoric acids with organic compounds containing olefinic groups.

3. A method of tanning hides and skins which comprises treating the skin with a solution containing as its essential tanning agent a compound of hexametaphosphoric acid and an alcohol.

4. A method of tanning hides and skins which comprises treating the skin with a solution containing as its essential tanning agent a compound of a fusion product of a mixture of polymeric phosphoric acids and a polymeric alkali-meta phosphate, and an organic compound containing hydroxyl groups.

5. A method of tanning hides and skins which comprises treating the skin with a solution containing as its essential tanning agent a compound of a fusion product of a mixture of polymeric phosphoric acids and an alkali-metal polyphosphate and an organic compound containing hydroxyl groups.

6. A method of tanning hides and skins which comprises treating the skin with a solution containing as its essential tanning agent a soluble alkali-metal salt of a reaction product of polymeric metaphosphoric acid with organic compound capable of esterification.

7. A method of tanning hides and skins which comprises treating the skin with a solution containing as its essential tanning agent a soluble metal salt of a reaction product of a polymeric metaphosphoric acid and an esterifiable organic compound.

8. A method of tanning hides and skins which comprises treating the skin with a solution containing as its essential tanning agent a soluble ammonia salt of a reaction product of a polymeric metaphosphoric acid and an esterifiable organic compound.

9. A method of tanning hides and skins which comprises treating the skin with a solution containing as its essential tanning agent a soluble salt of an organic base and a reaction product of a polymeric metaphosphoric acid and an organic compound containing hydroxyl groups.

10. A method of tanning hides and skins which comprises treating the same with a solution containing as its essential tanning agent a product derived from the action of a polymeric phosphoric acid upon an esterifiable organic compound.

11. A method of tanning hides and skins which comprises treating the skin with a solution containing as its essential tanning agent a compound which is prepared by the reaction of a fusion product of mixtures of polymeric phosphates and polymeric phosphoric acids with esterifiable organic compounds.

12. A method according to claim 11 characterized by the fact that the essential tanning agent is a water-soluble salt of the reaction product of polymeric phosphoric acids and an esterifiable organic compound.

13. A method according to claim 11 characterized by the fact that the essential tanning agent is a water-soluble salt of the reaction product of a fusion product of mixtures of polymeric phosphates and polymeric phosphoric acids and an esterifiable organic compound.

KURT LINDNER.